3,775,537
COPOLYMER COATINGS FOR
PHARMACEUTICALS
Klaus Lehmann, Rossdorf uber Darmstadt, and Horst Pennewiss, Darmstadt, Germany, assignors to Rohm G.m.b.H., Darmstadt, Germany
No Drawing. Filed June 18, 1971, Ser. No. 154,615
Claims priority, application Germany, June 27, 1970,
P 20 31 871.2
Int. Cl. A61k 27/12
U.S. Cl. 424—21                                   8 Claims

ABSTRACT OF THE DISCLOSURE

A copolymer comprising more than 90 percent by weight of a polymerized mixture of: (A) at least one hydroxyalkyl ester of an $\alpha,\beta$-unsaturated mono- or di-carboxylic acid; and (B) at least one monomer, copolymerizable with (A), which forms a water-insoluble homopolymer when homopolymerized. These non-cross-linked copolymers are soluble in organic solvents and insoluble in, but permeable to, water under physiological conditions. They are useful as cotings for pharmaceutical dosage forms.

---

The present invention relates to copolymer compositions adaptable to coating pharmaceutical dosage forms, and to such coated dosage forms.

Pharmaceutical dosage forms containing active materials which are soluble in the digestive juices and which should be released slowly, i.e. so-called "depot" materials or "retard" materials, can contain the active material within a shell or matrix comprising a water-insoluble synthetic resin which is, however, swellable and permeable to the active agent. In order ot release the active agent from the dosage form at the most uniform rate, coating masses are used whose swellability and permeability are as independent as possible of the pH value and the enzyme content of the digestive juices in the various portions of the digestive tract. According to Austrian patent publication 270,071, copolymers of polymerizable quaternary ammonium compounds and hydrophobic monomers, which when homopolymerized give water-insoluble materials, are suitable for this purpose.

However, the preparation and use of these copolymers entails many difficulties. Thun, the achievement of a desired degree of permeability requires very exact control of the content of quarternary ammonium compound. Water-insoluble coatings of this type can only be prepared if the content of quaternary ammonium compound is from about 5 to 10 percent by weight. Higher contents make the copolymer water-soluble, whereas the use of smaller amounts make it difficult to obtain reproducible results. As a result, the degree of permeability of the coating to the effective ingredient cannot be altered over as broad a range as is desirable in these known coating materials.

Further, it is difficult to prepare the known coatings as solid products. The extreme solubility differences of the components make the addition of solubility promoters necessary during polymerization. These solubility promoters must subsequently be removed again. For this purpose, as well as for the removal of any remaining content of monomers, the copolymers must be heated to temperatures of 120° C.–150° C. At these temperatures, there is already a certain amount of decomposition which can affect the properties of the coatings.

Finally, the quaternary ammonium groups of the known coatings have a tendency to bind adsorptively to many pharmaceutically effective agents, particularly those with polar groups and particularly those with acid groups.

Attempts to replace the quaternary ammonium group-containing monomers by less hydrophilic monomers having amide groups, such as acrylamide, methacrylamide, or vinyl pyrrolidone, have not been successful: the first two mentioned materials have a tendency toward cross-linking and the last-mentioned material tends to bind adsorptively.

According to British patent publication 1,135,996, pharmaceutical dosage forms have been prepared with a coating several millimeters thick of a cross-linked gel comprising hydroxyalkyl esters and glycol diesters of acrylic acid or methacrylic acid. The coating is prepared in situ by polymerization. Pharmaceutical dosage forms of this method are employed as implants. For reasons of cost, among others, this process has not found use in the preparation of oral "depot" or "retard" pharmaceutical dosage forms.

It has now been found that the above-described disadvantages of the prior art can be avoided if polymerizable hydroxyalkyl esters are used as the hydrophilic component of the coating materials. The esters do not cause any change in the active ingredients of a pharmaceutical dosage form, even if the active ingredients contain salt-like groups or groups which will form salts in an acid or alkaline medium. The degree of permeability desired in the copolymer coating can be adjusted with sure reproducibility over a broad range by variation in the content of hydroxyester therein. The degree of permeability can also be controlled by the thickness of the coating, a technique which is facilitated by the ease with which the new coating materials can be very uniformly applied.

The object of the present invention is, thus, the preparation of copolymers suitable as coating materials for pharmaceutical dosage forms. The coatings, which are soluble in organic solvents but are insoluble in water under physiological conditions, comprise a copolymer, free of cross-linking, which is permeable to lower molecular weight materials and comprises more than 90 percent by weight of a mixture of at least one hydroxyalkyl ester of an $\alpha,\beta$-unsaturated mono- or di-carboxylic acid and at least one polymerizable monomer forming a water-insoluble homopolymer. The new copolymer contains from about 1 to about 12, preferably from about 3 to about 10, percent of hydroxy groups by total weight of the copolymer.

The hydroxyalkyl esters which are comprised within the copolymer according to the present invention are preferably esters of acrylic acid or methacrylic acid. However, hydroxyalkyl diesters (optionally containing less than 10 percent by weight of hydroxyalkyl monoesters) of crotonic acid, itaconic acid, maleic acid, or fumaric acid can also be employed. The hydroxyalkyl portion as a rule contains from 2–6 carbon atoms, preferably from 2–4 carbon atoms. Thus, 2-hydroxyethyl-, 2-hydroxypropyl-, 2-hydroxybutyl-, or 4-hydroxybutyl esters, particularly those of acrylic acid or methacrylic acid, are usually employed.

A content of about 1 to about 12 percent of hydroxy groups, preferably from 3–10 percent, by total weight of copolymer, required according to the present invention, is obtained by incorporating into the copolymer from about 10 percent to about 80 percent by weight of the acrylic acid or methacrylic acid esters mentioned as preferred. With an increasing content of hydroxyalkyl esters, the hydrophilicity and, therefore, the permeability of the coatings to active agents, increase. The higher the content of hydroxyalkyl esters, the more rapidly does an active ingredient diffuse from a pharmaceutical dosage form into a surrounding medium. The rate of release can be very precisely regulated by variation of the hydroxy ester content of the copolymer over the broad range of, for example, 20–80 percent by weight.

As those monomers forming water-insoluble homopolymers, all monomers free of strongly hydrophilic groups can be employed, particularly esters of acrylic acid and methacrylic acid with alkanols having up to 8 carbon atoms, and preferably such esters having from 1-4 carbon atoms in the alkanol portion. Other monomers include styrene, α-methyl styrene, vinyl toluene, acrylonitrile, methacrylonitrile, vinyl chloride, and vinyl esters of lower carboxylic acids, such as vinyl acetate, propionate, or butyrate.

In addition to these hydrophobic monomers and the hydroxyalkyl esters, which together form from more than 90 percent to 100 percent by weight of the copolymer, the balance, if any, of less than 10 percent by weight comprises one or more of a variety of further different monomers, for example including also those monomers imparting hydrophilicity. Such comonomers include the same $\alpha,\beta$-unsaturated mono- and di-carboxylic acids which are also present in the copolymer as hydroxyalkyl esters, e.g. acrylic, methacrylic, maleic acid, etc., as well as acrylamide, methacrylamide, vinyl pyridine, and vinyl pyrrolidone. Dialkylaminoalkyl esters and tertiary alkyl salts of aminoalkyl esters of acrylic and methacrylic acid can also be mentioned, the alkyl groups in each case having from 1 to 4 carbon atoms. Even carboxylic acids, such as acrylic acid or methacrylic acid, or their salts do not render the copolymer water-soluble when used in the prescribed amounts of less than 10 percent by weight of the copolymer. On the other hand, it is possible that a tablet coating or matrix made from a copolymer of this type can be solubilized in the lower portions of the digestive tract where the digestive juice is already slightly alkaline. At this stage, the pharmaceutical dosage form has already been extensively leached out and solution of the copolymer can then only have the purpose of releasing that residue of the effective agent which can no longer be dissolved from the dosage form. Acid or basic groups in the copolymer can also compensate for a reduced solubility of the active agent in certain portions of the digestive tract by an increased permeability of the pharmaceutical coating. However, in these cases, it should be determined whether or not there is an undesirable reaction between the polymer and the active ingredient, for example when the active ingredient is basic and the polymer contains acid groups.

The polymers contained in the coating materials according to the present invention can be polymerized in bulk, in suspension, in emulsion, or in solution. The conditions of polymerization are suitably chosen in a manner known to those skilled in the art so that the polymer has a reduced viscosity $\eta_{sp.}/c$. from 0.015 to 0.05 liter per gram, measured in dimethyl formamide at 20° C. The polymer viscosity is adjusted to the desired value, in a manner known to those skilled in the art, by controlling the amount of initiator or chain transfer agent, such as dodecyl mercaptan, employed. When carrying out the process as a bulk polymerization, the addition of solubilizing agents is not necessary. The bulk polymer is heated for a short time in vacuum at 120° C.–150° C. in order to remove unreacted volatile monomers. This heating does not lead to any damage or disadvantageous change in the coating materials. For this purpose, a vacuum screw-extruder can be employed, for example. At the same time, additives such as pigments can be worked into the material. By polymerizing in a solvent such as an alcohol, ketone, or ester, polymer solutions suitable for directly coating pharmaceutical dosage forms can be prepared. Suitable solvents include, for example, isopropyl alcohol, acetone, and ethyl acetate.

The coating agents according to the present invention are generally employed for coating in the form of a 5-15 percent solution in one of the above-identified solvents. When the solvent evaporates, an integral, smooth, and elastic film remains on the dosage form. These coatings have sufficient solidity even at a film thickness of 10 microns. In most cases, a thickness of 20-60 microns gives the most advantageous results. Film thicknesses over 100 microns, up to about 200 microns, are obtained by adding solid auxiliaries such as talcum, magnesium stearate, or pigments to the coating solution. The rate of diffusion of the active ingredient is influenced by the thickness of the coating layer so that it is possible to prepare coatings having different diffusion rates using the same coating material. Within the range of film thicknesses given above, the release time of a readily water-soluble active ingredient can be varied over a time range of from 2-12 hours.

In order to provide a highly differentiated diffusion behavior for the coated active ingredient, the structure of the pharmaceutical dosage form can be varied in manifold ways. For example, coating mixtures having different degrees of permeability can be mixed with one another so-called "matrix" tablets can be made. The active intermediate a limited number of standard values. Further, drugs in powder or granular form can be coated with the new coating masses and the granulate obtained in this manner can be formed into larger units. Under pressure, so-called "matrix" tablet can be made. The active ingredient can be provided in a finer state of subdivision if it is mixed as a powder with the coating mass when the latter is also in powder form, and the resulting mixture, optionally after granulation, is formed into tablets or drageés. A mixture of the coating material with the active ingredient can also be obtained by kneading, injection molding, or by extrusion when the two are in a thermoplastic condition.

Finely-divided particles of an active ingredient, which are coated or mixed with the coating agents of the present invention in a first processing step, can be formed into tablets or drageés in a second step using binding agents. As binding agents, materials dissolving in the digestive tract can be used, such as sugar, gelatin, agar, or also water- or acid-soluble synthetic polymers. However, it is possible also to use polymers which are only swellable but which permit escape of the active ingredient by diffusion. Among the latter, those binding agents which swell more strongly and permit a more rapid diffusion of the active ingredient than do the coating agents of the invention are preferred.

As binding agents for use with the coating materials of the invention, various synthetic polymers can be employed, which, after a possible partial or complete diffusion of the active ingredients, dissolve either under the influence of enzymes or as a result of the generally increasing acidity of the digestive tract. Through measures of the sort—as well as by the application of a further coating onto the pharmaceutical dosage form—the onset of diffusion of the active ingredient can be delayed until the dosage form has reached a zone of the digestive tract where the outer coating or matrix of the dosage form dissolves and swelling of the exposed coating according to the present invention can begin.

Finally, the dosage form can be provided with an outer shiny colored coating, for example one comprising sugar, in order to improve its taste and/or its appearance.

A better understanding of the present invention and of its many advantages will be had by referring to the following specic examples given by way of illustration.

EXAMPLE 1

A mixture of 45 parts of methyl methacrylate, 25 parts of ethyl acrylate, and 30 parts of hydroxyethyl acrylate, dissolved in 150 parts of isopropyl alcohol with the addition of 2.25 parts of azobis-isobutyric acid ethyl ester, is polymerized in a reaction vessel having a reflux condenser, with stirring and in a $CO_2$ atmosphere, at 75° C. 20 percent of the reaction mixture is initially present and the remaining 80 percent is added over the course of four hours.

For coating tablets, the polymer solution so obtained is diluted with acetone to a solids content of 8 percent. 325 grams of this solution, per kilogram of tablet cores (each core being 7 millimeters in diameter; 3.5 millimeters high; 140 milligrams in weight; and containing 2.36 milligrams of trifluoroperazine dihydrochloride), are sprayed into a coating kettle with a pneumatic spray gun.

The coated tablets are stirred in synthetic stomach juices in a decomposition tester according to USP XIV and the release of active ingredient is followed spectrophotometrically at 254 millimicrons. Depending on the amount of coating, the following delayed release of the active ingredient is observed.

| Sample | Time release (percent) after— | | | | |
|---|---|---|---|---|---|
| | ½ hour | 1 hour | 2 hours | 4 hours | 8 hours |
| Untreated tablets | >90 | | | | |
| Coated tablets (165 g. coating solution/kg.) | 75 | >90 | | | |
| Coated tablets (245 g. coating solution/kg.) | 32 | 54 | 86 | >90 | |
| Coated tablets (325 g. coating solution/kg.) | 19 | 35 | 61 | 84 | >90 |

EXAMPLE 2

300 grams of the polymer solution described in Example 1 are diluted with 700 grams of acetone and sprayed into a coating kettle onto one kilogram of sugar pellets having a diameter of 1 millimeter and containing 1 percent of chloropheniramine maleate.

The coated microdragées are agitated in a decomposition tester in synthetic stomach juices and release of the active agent followed spectrophotometrically at 254 millimicrons. Depending on the amount of coating, the following delayed release of the active agent is observed.

| Sample | Time release (percent) after— | | | | |
|---|---|---|---|---|---|
| | ½ hour | 1 hour | 2 hours | 4 hours | 8 hours |
| Untreated microdragées | >90 | | | | |
| Coated microdragées (250 g. coating solution/kg.) | 65 | 78 | 90 | >90 | |
| Coated microdragées (500 g. coating solution/kg.) | 52 | 63 | 76 | 87 | >90 |
| Coated microdragées (750 g. coating solution/kg.) | 21 | 32 | 46 | 63 | 80 |
| Coated microdragées (1,000 g. coating solution/kg.) | 20 | 30 | 42 | 56 | 70 |

EXAMPLE 3

A mixture of 70 parts of methyl methacrylate and 30 parts of 2-hydroxypropylacrylate is dissolved in 100 parts of isopropyl alcohol with the addition of two parts of azo-bis-isobutyric acid ethyl ester and polymerized over a period of 7½ hours at 75° C. The product is diluted with acetone to a solids content of 8 percent.

250 g./kg. of this solution are sprayed over a period of 2½ hours into a rotating coating kettle containing microdragées 1 millimeter in diameter and having a content of 1 percent of chloropheniramine maleate. The release of the active agent is tested as in Example 2. The release of active agent amounts to 55 percent after ½ hour; 64 percent after 1 hour; 73 percent after two hours; 82 percent after four hours; and 89 percent after 8 hours.

EXAMPLE 4

A mixture of 53 parts by weight of methyl methacrylate, 27 parts of ethyl acrylate, and 20 parts of hydroxy ethylmethacrylate is polymerized according to the method of Example 1 and diluted with acetone to a solids content of 8 percent. 500 grams of the solution are used to coat chloropheniramine maleate microdragées as in Example 2 and the delayed release of the effective agent is tested in a USP decomposition tester in synthetic stomach juices at a pH of 2.0, in phosphate buffer at a pH of 5.0, and in synthetic intestinal juice at a pH of 7.4.

| pH | Time release (percent) after— | | | | |
|---|---|---|---|---|---|
| | ½ hour | 1 hour | 2 hours | 4 hours | 8 hours |
| 2.0 | 22 | 31 | 47 | 74 | >90 |
| 5.0 | 19 | 30 | 49 | 76 | >90 |
| 7.4 | 19 | 29 | 45 | 67 | >90 |

EXAMPLE 5

A bulk polymer comprising 60 parts of methyl methacrylate, 30 parts of ethyl acrylate, and 10 parts of hydroxyethyl methacrylate, prepared under the influence of 2.25 parts of azo-bis-isobutyric acid ethyl ester, is powdered. 60 grams of the product are then mixed with 120 g. of codein phosphate and 108 g. of lactose.

A further 12 grams of the polymer are dissolved in a mixture comprising 50 grams of acetone and 50 grams of isopropyl alcohol and the above-mentioned mixture of powders is moistened with this solution and granulated by passing through a sieve having 2 millimeter openings. After the addition of 10 percent of talc thereto, the dried granulate is pressed into tablets weighing 200 mg. and the delayed release of the active agent from the tablets is determined using a USP decomposition tester. The release of active agent amounted to: 40 percent after ½ hour; 52 percent after 1 hour; 65 percent after two hours; 83 percent after four hours; and more than 90 percent after eight hours.

EXAMPLE 6

Proceeding as in Example 3, a solution copolymer is prepared from 10 parts by weight of di-(hydroxyethyl)-itaconate and, as the component forming a water-insoluble homopolymer, a mixture of 40 parts by weight of styrene and 50 parts by weight of methyl acrylate. The hydroxy group content of the polymer is 1.6 percent.

EXAMPLE 7

Proceeding as in Example 6, a solution copolymer is prepared from 15 parts by weight of di-(hydroxyethyl)-maleinate and a mixture of 50 parts by weight of styrene and 35 parts by weight of vinyl acetate. The hydroxy group content of the copolymer is 2.5 percent.

EXAMPLE 8

Proceeding as in Example 6, a solution copolymer is prepared from 80 parts by weight of 2-hydroxybutyl acrylate and a mixture of 10 parts by weight of dimethyl itaconate and 5 parts by weight of vinylidene chloride as components forming water-insoluble homopolymers. In addition, the polymer comprises 5 parts by weight of vinyl pyrrolidone, a material forming a water-soluble homopolymer. The resulting polymer has an hydroxy content of 9.4 percent.

EXAMPLE 9

Proceeding as in Example 6, a solution copolymer is prepared from 50 parts by weight of 4-hydroxybutyl-methacrylate and, as monomers forming water-insoluble homopolymers, 30 parts of methyl methacrylate and 19 parts of dibutylitaconate. The polymer also contains one part by weight of dimethylaminoethyl methacrylate, which forms a water-soluble homopolymer. The hydroxy content of the polymer is 5 percent.

EXAMPLE 10

Proceeding as in Example 6, a solution copolymer is prepared from 30 parts by weight of 4-hydroxybutyl-methacrylate and, as the component forming water-insoluble homopolymers, 10 parts of methyl acrylate, 40 parts of ethyl acrylate, and 11 parts of methacrylonitrile. The polymer additionally contains 9 parts by weight of acrylamide, a monomer forming a water-soluble homopolymer. The hydroxy content of the polymer is 3 percent.

EXAMPLE 11

Proceeding as in Example 6, a solution copolymer is prepared from 80 parts by weight of 2-hydroxyethylacrylate, 18 parts by weight of methyl acrylate as the component forming a water-insoluble homopolymer, and 2 parts by weight of methacryloxyethyltrimethylammonium chloride, a monomer forming a water-soluble homopolymer. The hydroxy content of the polymer is 11.8 percent.

EXAMPLE 12

Proceeding as in Example 6, a solution copolymer is prepared from 70 parts by weight of 6-hydroxyhexylmethacrylate, a mixture of 20 parts of methyl methacrylate and 5 parts of acrylonitrile as the component forming water-insoluble homopolymers, and 5 parts by weight of acrylic acid. The resulting copolymer has an hydroxy content of 6.9 percent.

EXAMPLE 13

Proceeding as in Example 6, a solution copolymer comprising 70 parts of 2-hydroxyethylmethacrylate, 5 parts by weight of maleic acid (as a component forming a water-soluble homopolymer) and, as the component forming water-insoluble homopolymers, a mixture of 10 parts by weight of ethyl acrylate, 10 parts by weight of diethyl malonate, and 5 parts by weight of acrylonitrile. The resulting polymer has an hydroxy content of 9.2 percent.

EXAMPLE 14

Proceeding as in Example 6, a solution copolymer is prepared from 50 parts by weight of 4-hydroxybutyl methacrylate and, as the component forming water-insoluble homopolymers, a mixture of 30 parts by weight of methyl methacrylate and 20 parts by weight of 2-ethylhexylacrylate. The hydroxy content of the resulting polymer is 5.0 percent.

What is claimed is:

1. An orally-ingestible pharmaceutical dosage unit form comprising a pharmaceutically effective ingredient in finely-divided, granule, pellet, microdragée, or tablet form, and a coating applied thereover in a thickness of 10–200 microns, said coating consisting essentially of a copolymer, free of cross-linking, soluble in organic solvents, particularly isopropyl alcohol, acetone, or ethyl acetate, and insoluble in, but permeable to, water under physiological conditions, said copolymer being applied to said pharmaceutically effective ingredient by contacting said ingredient with a solution of said copolymer in an organic solvent and then evaporating said organic solvent to form said coating, said copolymer comprising a polymerized mixture of:

(A) at least one hydroxyalkyl ester of an $\alpha,\beta$-unsaturated mono- or di-carboxylic acid, present in said copolymer in an amount providing from 1–12 percent of hydroxy groups by total weight of the copolymer, selected from the group consisting of hydroxyalkyl esters of acrylic acid and methacrylic acid, hydroxyalkyl diesters of crotonic acid, itaconic acid, maleic acid, and fumaric acid, and mixtures of hydroxyalkyl diesters of crotonic acid, itaconic acid, maleic acid, and fumaric acid containing up to 10 percent by weight of hydroxyalkyl monoesters of these acids, the hydroxyalkyl portion of said esters and diesters having from 2–6 carbon atoms, this amount of hydroxy groups corresponding to the presence of from about 10 percent to about 80 percent, by weight of the copolymer, of said hydroxyalkyl esters of acrylic acid and of methacrylic acid when component (A) is comprised of these esters; and (B) at least one monomer, copolymerizable with (A), which forms a water-insoluble homopolymer when homopolymerized, said monomer being selected from the group consisting of esters of acrylic acid and methacrylic acid with 1–8 carbon atom alkanols; (A) and (B) together forming 90–100 percent by weight of said copolymer, the balance, if any, of said copolymer comprising 0–10 percent by weight of at least one other monomer, copolymerized with (A) and (B), selected from the group consisting of acrylic acid, methacrylic acid, crotonic acid, itaconic acid, maleic acid, fumaric acid, acrylamide, methacrylamide, vinyl pyridine, vinyl pyrrolidone, and dialkylaminoalkyl esters and tertiary alkyl salts of aminoalkyl esters of acrylic and methacrylic acid wherein the alkyl groups in each case have from 1–4 carbon atoms; readily water-soluble active ingredients being released from said dosage unit form over a time range of from 2–12 hours, the degree of permeability desired in said copolymer coating being adjustable by controlling the thickness of the coating and by variation in the hydroxyalkyl content of the copolymer over the range of 1–12 percent of hydroxy groups therein, the higher the content of hydroxyalkyl esters and hydroxy groups, the more permeable the coatings to active ingredients and the more rapidly does the active ingredient diffuse from the pharmaceutical dosage form into the surrounding medium.

2. A dosage unit form as in claim 1 wherein components (A) and (B) together form 100 percent by weight of said copolymer.

3. A dosage unit form as in claim 1 wherein, in component (B), said esters of acrylic acid and methacrylic acid are esters with 1–4 carbon atom alkanols.

4. A dosage unit form as in claim 1 wherein component (A) is comprised of hydroxyalkyl esters of acrylic acid.

5. A dosage unit form as in claim 1 wherein component (A) is comprised of hydroxyalkyl esters of methacrylic acid.

6. A dosage unit form as in claim 1 wherein said copolymer comprises from about 3 percent to about 10 percent of hydroxy groups by total weight of the copolymer.

7. A dosage unit form as in claim 1 wherein, in said copolymer, said other monomer, comprising less than 10 percent by weight of the copolymer, is an $\alpha,\beta$-unsaturated mono- or di-carboxylic acid or a salt thereof.

8. A dosage unit form as in claim 1 wherein, in said copolymer, said hydroxyalkyl ester is the acrylate or methacrylate of 2-hydroxyethanol, 2-hydroxypropanol, 2-hydroxybutanol, or 4-hydroxybutanol.

References Cited

UNITED STATES PATENTS

| | | | |
|---|---|---|---|
| 3,577,516 | 5/1971 | Gould et al. | 424—46 |
| 3,577,512 | 5/1971 | Shepherd et al. | 424—21 |
| 3,551,556 | 12/1970 | Kliment et al. | 424—21 |
| 3,689,634 | 9/1972 | Kliment et al. | 424—21 |

SHEP K. ROSE, Primary Examiner

U.S. Cl. X.R.

260—86.1; 424—33, 81